United States Patent [19]
North et al.

[11] Patent Number: 5,609,466
[45] Date of Patent: Mar. 11, 1997

[54] GAS TURBINE VANE WITH A COOLED INNER SHROUD

[75] Inventors: William E. North, Winter Springs; Mark T. Kennedy, Oviedo, both of Fla.

[73] Assignee: Westinghouse Electric Corporation, Pittsburgh, Pa.

[21] Appl. No.: 562,945

[22] Filed: Nov. 27, 1995

Related U.S. Application Data

[63] Continuation of Ser. No. 336,895, Nov. 10, 1994, abandoned.

[51] Int. Cl.⁶ ............................ F01D 9/04; F01D 9/06
[52] U.S. Cl. ............................ 415/115; 416/96 A
[58] Field of Search ............................ 415/115; 416/96 A, 416/96 R, 97 R

[56] References Cited

U.S. PATENT DOCUMENTS

| | | |
|---|---|---|
| 4,474,532 | 10/1984 | Pazder . |
| 4,902,198 | 2/1990 | North . |
| 4,930,980 | 6/1990 | North et al. . |
| 4,962,640 | 10/1990 | Tobery . |
| 5,358,374 | 10/1994 | Correia et al. ............... 415/115 |
| 5,399,065 | 3/1995 | Kudo et al. .................. 415/115 |
| 5,413,458 | 9/1995 | Calderbank . |
| 5,488,825 | 2/1996 | Davis et al. ................. 415/115 |

FOREIGN PATENT DOCUMENTS

| | | |
|---|---|---|
| 0392664 | 10/1990 | European Pat. Off. . |
| 2093923 | 9/1982 | United Kingdom . |
| 2104965 | 3/1983 | United Kingdom . |
| 2244520 | 12/1991 | United Kingdom . |

*Primary Examiner*—Edward K. Look
*Assistant Examiner*—Christopher Verdier
*Attorney, Agent, or Firm*—M. G. Panian

[57] ABSTRACT

A gas turbine vane having an inner shroud that is cooled by a portion of the cooling air directed to a cavity between two adjacent rows of discs. A portion of the cooling air in the cavity flows through impingement plates and impinges on the inner surface of the inner shroud. Another portion of the cooling air flows through a passage in the leading edge of the inner shroud that has a pin fin array for enhanced cooling. The impingement plates form chambers that collect both the impingement air and the pin fin passage air and direct it through holes in the trailing edge of the inner shroud for cooling of the trailing edge. Longitudinal passages along the side of the inner shroud direct the cooling air from the pin fin passage tot the trailing edge.

19 Claims, 4 Drawing Sheets

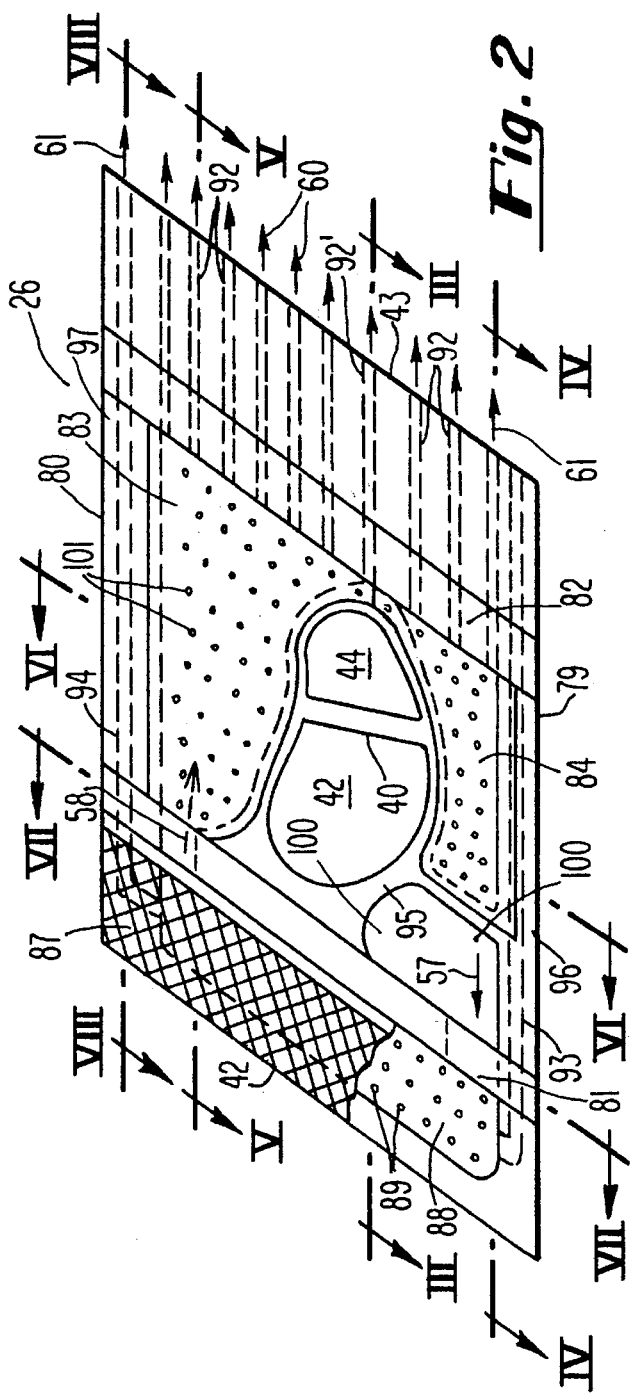
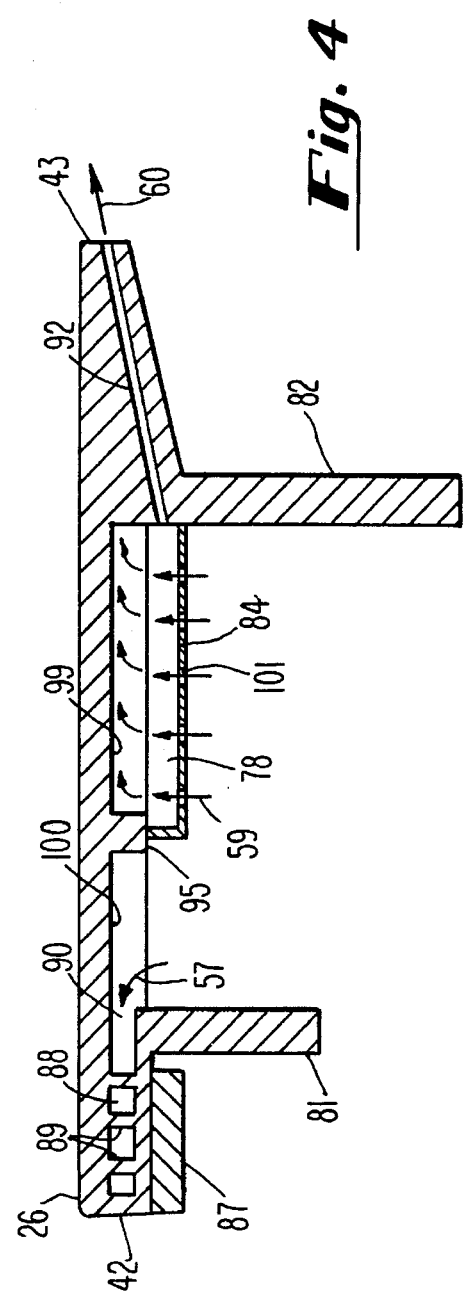

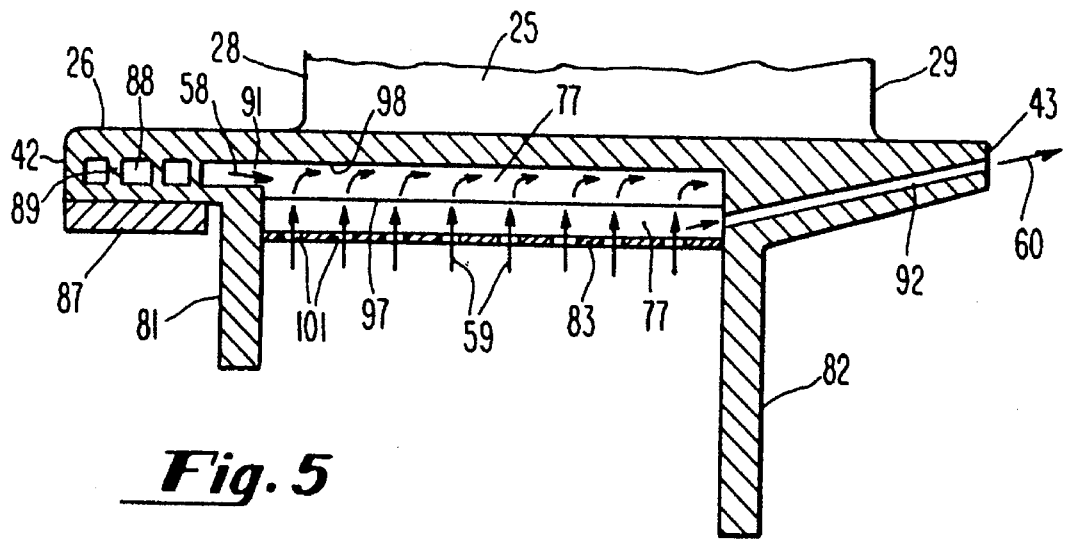
*Fig. 5*
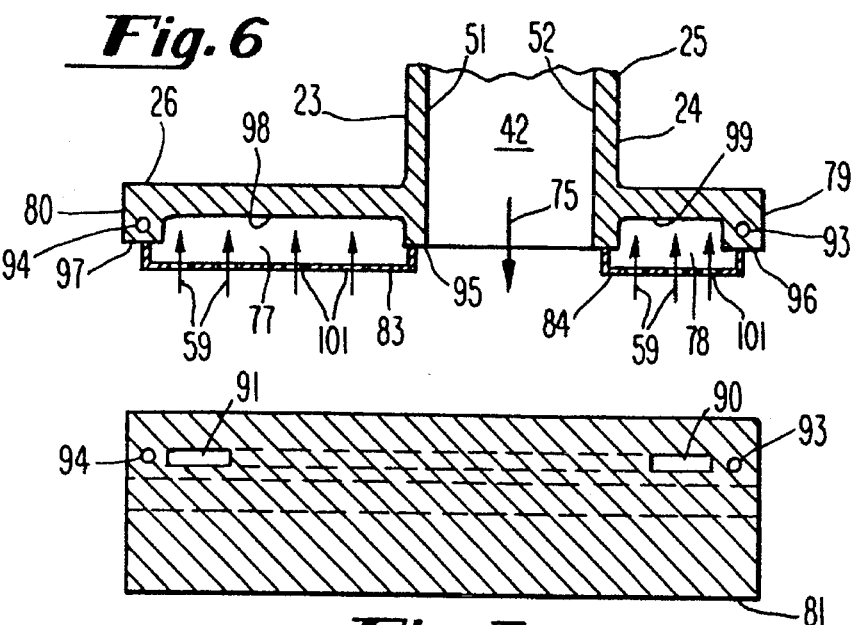
*Fig. 6*
*Fig. 7*
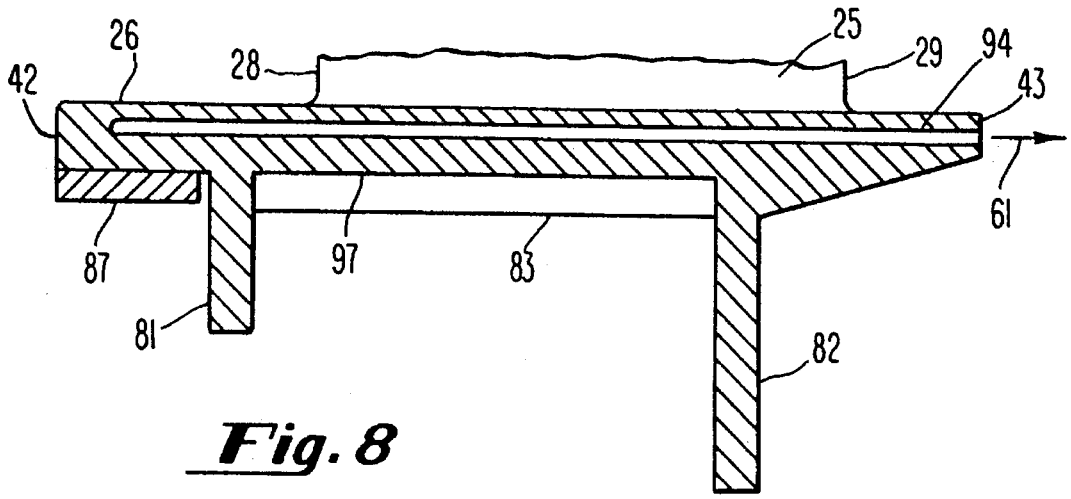
*Fig. 8*

GAS TURBINE VANE WITH A COOLED INNER SHROUD

This application is a continuation, of application Ser. No. 08/336,895 filed Nov. 10, 1994, now abandoned.

BACKGROUND OF THE INVENTION

The present invention relates to a stationary vane for use in the turbine section of a gas turbine. More specifically, the present invention relates to the cooling of the inner shroud portion of a gas turbine vane.

A gas turbine employs a plurality of stationary vanes that are circumferentially arranged in rows in a turbine section. Each vane is comprised of an airfoil section formed between inner and outer shrouds. Since such vanes are exposed to the hot gas discharging from the combustion section, cooling of these vanes is of utmost importance. Typically, cooling is accomplished by flowing cooling air through radially oriented passages, such as forward and aft passages, formed inside the vane airfoil.

A portion of the cooling air flowing through the aft airfoil passage is typically discharged through cooling air holes in the trailing edge of the airfoil. Another portion of the cooling air flowing through the aft passage, as well as the cooling air flowing through the forward airfoil passage, is typically discharged from the vane through the inner shroud and enters a cavity located between adjacent rows of rotor discs. The cooling air in the cavity serves to cool the faces of the discs.

In the past, a portion of the cooling from the cavity between the discs has sometimes been used to cool the inner shroud by impinging cooling air against the shroud surface or flowing cooling air through passages in the body of the shroud. Unfortunately, traditional schemes have not made optimum use of this cooling air. Although such cooling air eventually enters the hot gas flowing through the turbine section, little useful work is obtained from the cooling air, since it was not subject to heat up in the combustion section. Thus, to achieve high efficiency, it is crucial that the cooling air be effectively utilized so as to minimize the amount of cooling air used.

It is therefore desirable to provide a scheme for efficiently cooling the inner shroud of a gas turbine vane.

SUMMARY OF THE INVENTION

Accordingly, it is the general object of the current invention to provide a scheme for efficiently cooling the inner shroud of a gas turbine vane.

Briefly, this object, as well as other objects of the current invention, is accomplished in a gas turbine comprising (i) a compressor for producing compressed air, (ii) a combustor for heating at least a portion of the compressed air, thereby producing a hot compressed gas, and (iii) a turbine for expanding the hot compressed gas so as to produce shaft power. The turbine has a stationary vane disposed therein that is exposed to the hot compressed gas and a cavity in flow communication with the compressor, whereby the cavity receives a flow of cooling air formed by a portion of the compressed air. The stationary vane has an airfoil portion and a shroud portion disposed adjacent to the cavity. The shroud portion has a first passage in flow communication with the cavity, whereby the first passage receives a portion of the cooling air. An array of pin fins are disposed in the first passage.

According to one embodiment of the invention, the inner shroud further comprises (i) a first surface exposed to the flow of hot compressed gas and a second surface disposed opposite the first surface, and (ii) means for impinging cooling air against the second surface. The means for impinging cooling air comprises a plate attached to the inner shroud, the plate having a plurality of holes formed therein. In this embodiment, the holes in the plate are in flow communication with the cavity, whereby the second portion of the cooling air flows through the holes and forms the cooling air that impinges against the shroud surface.

BRIEF DESCRIPTION OF THE DRAWINGS

FIG. 2 is a view of the underside—that is, looking radially outward, of the inner shroud portion of the row 2 vane shown in FIG. 1.

FIG. 4 is a cross-section taken through line IV—IV shown in FIG. 2, showing the inlet to the pin fin passage.

FIG. 5 is a cross-section taken through line V—V shown in FIG. 2, showing the impingement chamber and inner shroud trailing edge cooling hole.

FIG. 6 is a cross-section taken through line VI—VI shown in FIG. 2, showing both impingement chambers.

FIG. 7 is a cross-section taken through line VII—VII shown in FIG. 2, showing the inlet and outlet to the pin fin passage.

FIG. 8 is a cross-section taken through line VIII—VIII shown in FIG. 2, showing the cooling air hole in the side rail of the inner shroud.

It should be noted that cross-sections taken through FIG. 2 would show the vane oriented upside down from the manner in which it is normally viewed. Therefore, to allow ready comprehension, FIGS. 3–8 have been rotated so that the vane is oriented in its normal upright position.

DESCRIPTION OF THE PREFERRED EMBODIMENT

Figure 1:
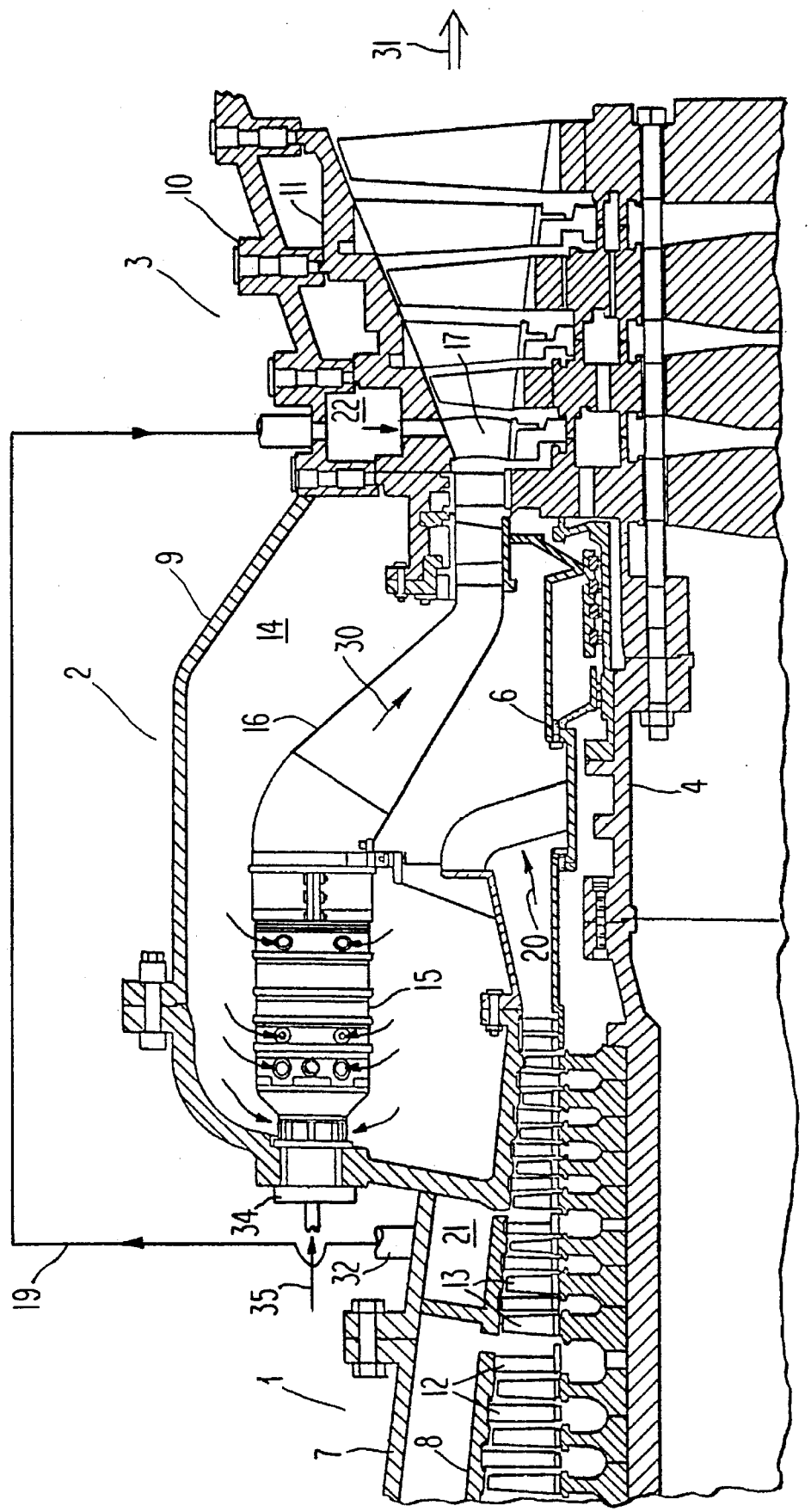
FIG. 1 is a longitudinal cross-section, partially schematic, of a gas turbine incorporating the vane of the current invention.

Referring to the drawings, there is shown in FIG. 1 a longitudinal cross-section through a portion of a gas turbine. The major components of the gas turbine are a compressor section 1, a combustion section 2, and a turbine section 3. As can be seen, a rotor 4 is centrally disposed and extends through the three sections. The compressor section 1 is comprised of cylinders 7 and 8 that enclose alternating rows of stationary vanes 12 and rotating blades 13. The stationary vanes 12 are affixed to the cylinder 8 and the rotating blades 13 are affixed to discs attached to the rotor 4.

The combustion section 2 is comprised of an approximately cylindrical shell 9 that forms a chamber 14, together with the aft end of the cylinder 8 and a housing 6 that encircles a portion of the rotor 4. A plurality of combustors 15 and ducts 16 are contained within the chamber 14. The ducts 16 connect the combustors 15 to the turbine section 3. Fuel 35, which may be in liquid or gaseous form—such as distillate oil or natural gas—enters each combustor 15 through a fuel nozzle 34 and is burned therein so as to form a hot compressed gas 30.

The turbine section 3 is comprised of an outer cylinder 10 that encloses an inner cylinder 11. The inner cylinder 11 encloses rows of stationary vanes and rows of rotating blades that are circumferentially arranged around the centerline of the rotor 4. The stationary vanes are affixed to the inner cylinder 11 and the rotating blades are affixed to discs that form a portion of the turbine section of the rotor 4.

In operation, the compressor section 1 inducts ambient air and compresses it. A portion of the air that enters the compressor is bled off after it has been partially compressed and is used to cool the rows 2–4 stationary vanes within the turbine section 3, as discussed more fully below. The remainder of the compressed air 20 is discharged from the compressor section 1 and enters the chamber 14. A portion of the compressed air 20 is drawn from the chamber 14 and used to cool the first row of stationary vanes, as well as the rotor 4 and the rotating blades attached to the rotor. The remainder of the compressed air 20 in the chamber 14 is distributed to each of the combustors 15.

In the combustors 15, the fuel 35 is mixed with the compressed air and burned, thereby forming the hot compressed gas 30. The hot compressed gas 30 flows through the ducts 16 and then through the rows of stationary vanes and rotating blades in the turbine section 3, wherein the gas expands and generates power that drives the rotor 4. The expanded gas 31 is then exhausted from the turbine 3.

The current invention is directed to the cooling of the stationary vanes and will be discussed in detail with reference to the second row of stationary vanes 17. As shown in FIG. 1, a portion 19 of the air flowing through the compressor 1 is extracted from an interstage bleed manifold 21, via a pipe 32, and is directed to the turbine section 3. In the turbine section 3, the cooling air 19 enters a manifold 22 formed between the inner cylinder 11 and the outer cylinder 10. From the manifold 22, the cooling air 19 enters the second row vanes 17.

Figure 3:
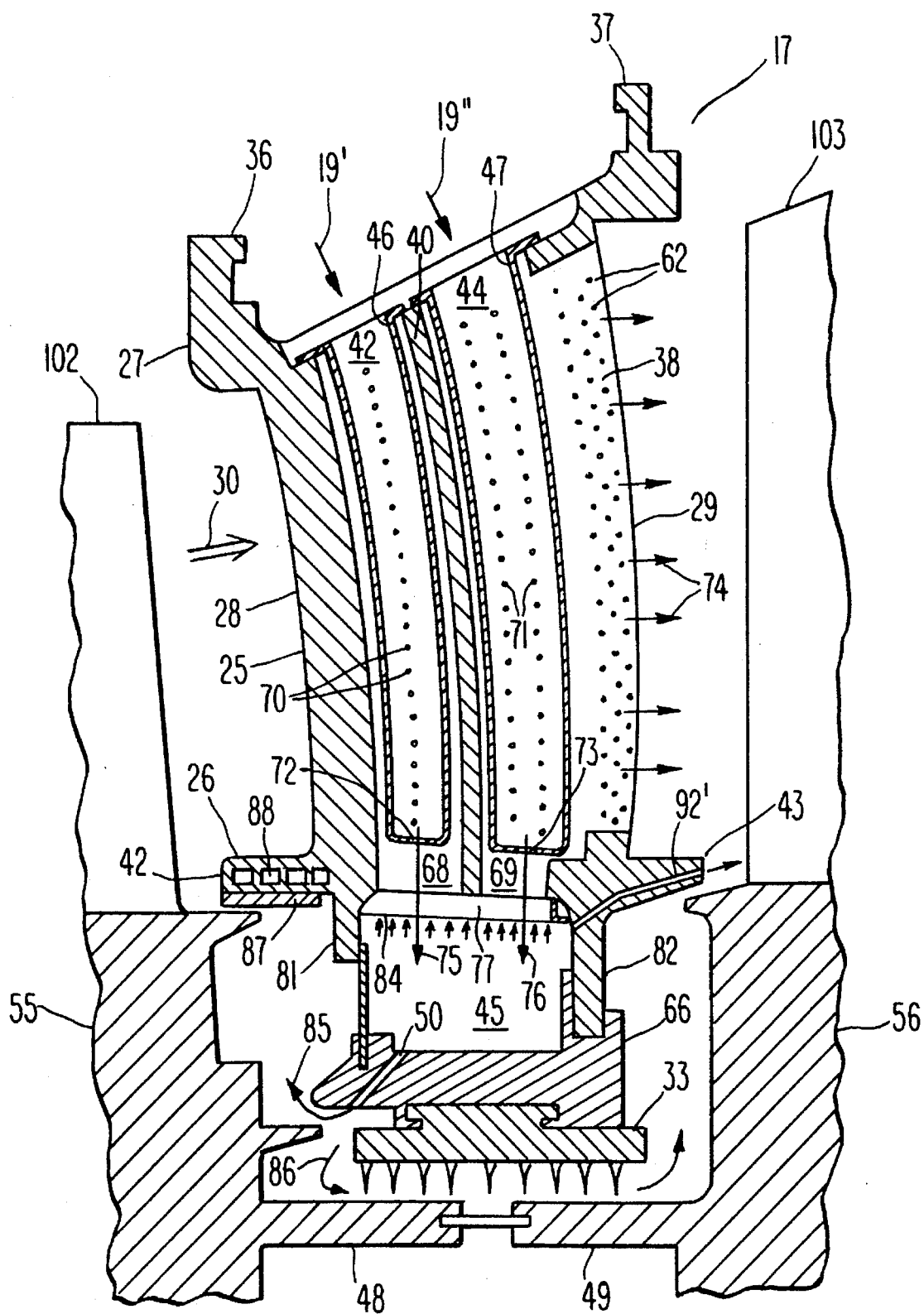
FIG. 3 is a cross-section taken through line III—III shown in FIG. 2, showing a detailed view of the portion of FIG. 1 in the vicinity of the row 2 vane.

As shown in FIG. 3, the vane 17 is comprised of an airfoil portion 25 that is disposed between inner and outer shrouds 26 and 27, respectively. Support rails 36 and 37 formed on the outer shroud 27 are used to attach the vane 17 to the turbine inner cylinder 11. As shown in FIG. 6, the airfoil portion 25 of the vane 17 has generally concave shaped wall 51, which forms the pressure surface 23 of the airfoil, and a generally convex wall 52, which forms the suction surface 24 of the airfoil. At their upstream and downstream ends, the walls 51 and 52 form the leading and trailing edges 28 and 29, respectively, of the airfoil 25. The airfoil 25 is substantially hollow and a rib 40 divides the interior into fore and aft passages 42 and 44, respectively.

Tubular members 46 and 47—referred to as "inserts"— are attached to the outer shroud 27 and extend into the fore and aft cavities 42 and 44, respectively. A number of small cooling air holes 70 and 71 are formed in the inserts 46 and 47. The cooling air holes 70 and 71 serve to impinge cooling air on the airfoil walls 51 and 52 and to distribute portions of the cooling air 19' and 19" around the fore and rear passages 42 and 44.

The concave and convex walls 51 and 52, respectively, form a cooling air passage 38 between themselves in the region of the trailing edge 29 of the airfoil 25. A number of pins 62—often referred to as "pin fins"—extend transversely through the passage 38 and serve to create turbulence that increases the heat transfer coefficient of the cooling air 74 flowing through the passage.

Although a substantial portion of the cooling air 19 flowing through the inserts 46 and 47 exits via the holes 70 and 71 distributed around the walls of the inserts, portions 75 and 76 of the cooling air 19 exit through holes 72 and 73 formed in the bottom of the inserts 46 and 47, respectively, as shown in FIG. 3. The cooling air portions 75 and 76 exit the vane 17 through openings 68 and 69 in the inner shroud 26. From the openings 68 and 69 the cooling air 75 and 76 enters an annular cavity 45 formed between the inner shroud 26 and the discs 55 and 56 of the rotor 4. The first row of rotating blades 102 are attached to the disc 55 and the second row of rotating blades 103 are attached to the disc 56.

An interstage seal housing 66 is attached to the inner shroud 26 by bolts (not shown) and carries a seal 33. A plurality of labyrinth fins from the seal 33 extend into an annular passage formed between the seal 33 and arms 48 and 49 that extend from the discs 55 and 56, respectively. The seal housing 66 controls the flow of cooling air from the cavity 45. Specifically, passages 50 in the housing direct a portion of the cooling air 75 and 76 out of the cavity 45, whereupon it is split into two streams 85 and 86. The first stream 85 flows radially outward into the hot gas 30 flowing through the turbine section 3. In so doing, the cooling air 85 cools the rear face of the disc 55 and prevents the hot gas 30 from flowing over the disc face. A honeycomb seal 87 formed in the vane inner shroud 26 regulates the flow of cooling air 85 into the hot gas 30.

The second stream 86 flows through the annular labyrinth seal passage and then flows radially outward into the hot gas 30 flowing through the turbine section 3. In so doing, the cooling air 86 cools the front face of the disc 56 and prevents the hot gas 30 from flowing over the disc face.

Since the pressure of the hot gas 30 flowing over the second row of rotating blades is lower than that flowing over the first row of rotating blades, were it not for the seal 33 substantially all of the cooling air would flow downstream to the disc 56. The seal 33 prevents this from happening, thereby ensuring cooling of the upstream disc 55.

According to the current invention, another portion of the cooling air 75 and 76 delivered to the cavity 45 is used to cool the inner shroud 26.

The inner shroud 26 has a radially outward facing surface—that is, the surface that faces toward the outer shroud 27 and that is exposed to the flow of hot gas 30. The inner shroud 26 also has a radially inward facing surface—that is, the surface that is opposite the radially outward facing surface and that faces toward the seal housing 66. Fore and aft support lugs 81 and 82 extend radially inward from the shroud radially inward facing surface and form a portion of the cavity 45.

As shown best in FIGS. 2 and 6, the radially inward facing surface of the inner shroud 26 forms a raised portion 95 around the passages 42 and 44 that is sometimes referred to as a "race track." The radially inward facing surface also forms raised portions 96 and 97 along each of the longitudinal edges 79 and 80 that are referred to as "rails." In between these raised portions 95–97 are recessed portions 98–100, as shown in FIGS. 4–6.

As shown in FIGS. 2 and 4–6, the two recessed portions 98 and 99 are covered by impingement plates 83 and 84, respectively. The edges of the plates 83 and 84 are attached to the raised portions 95–97 and the rear support lug 82, for example, by welding. Chambers 77 and 78 are formed between the impingement plates 83 and 84, respectively, and the recessed portions 98 and 99, respectively. Numerous small holes 101 are distributed around each of the impingement plates 83 and 84 that cause a portion of the cooling air 75 and 76 delivered to the cavity 45 to form jets 59 that flow through the chambers 77 and 78 and impinge against the surfaces of the recessed portions 98 and 99, thereby providing impingement cooling of the inner shroud 26.

The jets of cooling air 59 that enter through the holes 101 in the impingement plates 83 and 84 are collected by the chamber 77 and 78. As shown in FIGS. 2–5, a number of axially extending passages 92 and 92' are formed in the portion of the inner shroud 26 adjacent the trailing edge 43. The passage 92', which is located in the center portion of the inner shroud 26, is connected directly to the cavity 45, as shown in FIG. 3. However, the passages 92 in the remaining portions of the inner shroud have inlets that are connected to the chambers 77 and 78, as shown in FIGS. 4 and 5. Thus, the cooling air jets 59 collected by the chambers 77 and 78 flow through the passages 92 and serve to cool the trailing edge portion of the inner shroud 26 after they have accomplished the impingement cooling.

As shown in FIGS. 2–5, a transversely extending passage 88 is formed in the portion of the inner shroud 26 adjacent the leading edge 41. The passage 88 preferably has a height in the radial direction of approximately 0.6 cm (0.25 inch) and extends across almost the entirety of the width of the inner shroud 26. According to an important aspect of the current invention, the passage 88 contains numerous radially oriented pin fins 89 that connect the opposing walls of the passage. As previously discussed, the array of pin fins 89 create turbulence that increases the heat transfer coefficient of the cooling air flowing through the passage 88. In the preferred embodiment, the pin fins 89 have a diameter of approximately 0.3 cm (0.12 inch) and are spaced approximately 1.0 cm (0.4 inch) apart.

As shown in FIGS. 2, 4 and 7, a passage 90 is formed in the forward support lug 81 adjacent the recessed portion 100. The passage 90 forms an inlet that allows another portion 57 of the cooling air 75 and 76 delivered to the cavity 45 to enter the passage 88 by flowing longitudinally upstream. After entering the passage 88, the cooling air 57 turns approximately 90° and flows transversely through the passage 88 and, with the aid of the array of pin fins 89, cools the portion of the inner shroud 26 adjacent the leading edge 41.

As shown in FIGS. 2, 5 and 7, a passage 91 is formed in the forward support lug 81 adjacent the recessed portion 98. The passage 91 forms an outlet that allows a portion 58 of the cooling air 57 to exit the leading edge passage 88 after it has flowed along substantially the entirety of the length of the passage 88. After turning approximately 90°, the cooling air 58 flows longitudinally downstream and enters the chamber 77 formed by the impingement plate 83. The chamber 77 collects the jets 59 of cooling air that flowed through the holes 101 in the impingement passage 83 as well as cooling air 58 from the leading edge passage 88 and directs it to the trailing edge passages 92 that have their inlets connected to the chamber 77. The cooling air 60 flowing through the trailing edge passages 92 then exits the inner shroud 26 through outlets in the trailing edge 43.

As shown in FIGS. 2 and 8, another portion 61 of the cooling air 57 that entered the leading edge passage 88 flows into passages 93 and 94. The passages 93 and 94 extend longitudinally through the raised portions 96 and 97, respectively, along the longitudinal edges 79 and 80, respectively, of the inner shroud 26. Thus, the cooling air 61 serves to cool the raised portions 96 and 97 as well as the leading edge portion of the inner shroud 26.

As can be seen, according to the present invention, maximum use is made of a portion of the cooling air 75 and 76 directed to the disc cavity 45 to provide impingement cooling of the radially inward facing surface of the inner shroud 26, as well as convective cooling of the leading edge portion, using the enhanced heat transfer provided by the pin fins 89, the trailing edge portion and the raised portions 96 and 97.

Although the present invention has been described with reference to the shrouds of the second row of stationary vanes in a gas turbine, the invention is also applicable to other rows of stationary vanes. According, the present invention may be embodied in other specific forms without departing from the spirit or essential attributes thereof and, accordingly, reference should be made to the appended claims, rather than to the foregoing specification, as indicating the scope of the invention.

We claim:

1. A gas turbine comprising:

a) a compressor for producing compressed air;

b) a combustor for heating at least a portion of said compressed air, thereby producing a hot compressed gas; and c) a turbine for expanding said hot compressed gas so as to produce shaft power, said turbine further comprising:
   i) a rotor centrally disposed therein;
   ii) a generally hollow stationary vane disposed therein that is exposed to said hot compressed gas, said stationary vane having an outer shroud portion, an inner shroud portion and an airfoil portion disposed therebetween, said outer shroud portion being in flow communication with a flow of cooling air formed by a second portion of said compressed air, said cooling air passing through said outer shroud portion and said airfoil portion;
   iii) a cavity being formed between said inner shroud portion and said rotor, said cavity receiving said flow of cooling air after passing through said inner shroud portion;
   iv) said inner shroud portion having a first passage formed therein, said first passage being in flow communication with said cavity, whereby said first passage receives at least a first portion of said cooling air, an array of pin fins disposed in said first passage and substantially radially oriented therein for increasing heat transfer from said inner shroud to said first portion of said cooling air; and wherein said inner shroud further comprises:
      a) leading and trailing edges, said first passage being formed in a portion of said inner shroud adjacent said leading edge;
      b) a chamber formed therein, said first passage in flow communication with said chamber, whereby said chamber receives at least a portion of said cooling air received by said first passage; and
      c) a plurality of second passages formed in said trailing edge portion, said second passages in flow communication with said chamber, wherein said second passages receive at least a portion of said cooling air received by said chamber.

2. The gas turbine according to claim 1, wherein said inner shroud further comprises:

a) a first surface exposed to said flow of hot compressed gas and a second surface disposed opposite said first surface; and b) means for impinging cooling air against said second surface.

3. The gas turbine according to claim 2, wherein said means for impinging cooling air comprises a plate attached to said inner shroud, said plate having a plurality of holes formed therein.

4. The gas turbine according to claim 3, wherein said holes in said plate are in flow communication with said cavity, whereby a second portion of said cooling air flows through said holes and forms said cooling air that impinges against said inner shroud second surface.

5. The gas turbine according to claim 3, wherein a chamber is formed between said second surface and said plate, said chamber in flow communication with said holes in said plate and with said first passage, whereby said chamber receives cooling air comprised of said second portion of said cooling air that impinges against said inner shroud second surface and at least a portion of said first portion of said cooling air received by said first passage.

6. The gas turbine according to claim 5, wherein said inner shroud further comprises a plurality of second passages extending from said chamber, whereby said second passages receive at least a portion of said cooling air received by said chamber.

7. The gas turbine according to claim 6, wherein said inner shroud has a trailing edge portion, said second passages disposed in said trailing edge portion.

8. The gas turbine according to claim 5, wherein said inner shroud has first and second longitudinal edges, a second passage formed adjacent said first edge, said second passage in flow communication with said first passage, whereby said second passage receives at least a portion of said first portion of said cooling air received by said first passage.

9. The gas turbine according to claim 2, wherein said airfoil has a radially inward end and a radially outward end, said inner shroud being formed on said radially inward end, and wherein said second surface is a radially inward facing surface.

10. The gas turbine according to claim 9, wherein said cavity is formed between said inner shroud and said rotor.

11. A gas turbine comprising:
a) a compressor for producing compressed air;
b) a combustor for heating at least a portion of said compressed air, thereby producing a hot compressed gas; and
c) a turbine for expanding said hot compressed gas so as to produce shaft power, said turbine further comprising:
  i) a rotor centrally disposed therein;
  ii) a generally hollow stationary vane disposed therein that is exposed to said hot compressed gas, said stationary vane having an outer shroud portion, an inner shroud portion and an airfoil portion disposed therebetween, said outer shroud portion being in flow communication with a flow of cooling air formed by a second portion of said compressed air, said cooling air passing through said outer shroud portion and said airfoil portion;
  iii) a cavity being formed between said inner shroud portion and said rotor, said cavity receiving said flow of cooling air after passing through said inner shroud portion;
  iv) said inner shroud portion having a first passage formed therein, said first passage being in flow communication with said cavity, whereby said first passage receives at least a first portion of said cooling air, an array of pin fins disposed in said first passage and substantially radially oriented therein for increasing heat transfer from said inner shroud to said first portion of said cooling air; and
  v) said inner shroud has transversely extending leading and trailing edges, and first and second longitudinally extending edges defining a width of said inner shroud therebetween, said first passage extending transversely through a portion of said inner shroud width.

12. The gas turbine according to claim 11, wherein said first passage is disposed adjacent said leading edge.

13. A gas turbine comprising:
a) a compressor for producing compressed air;
b) a combustor for heating at least a portion of said compressed air, thereby producing a hot compressed gas; and
c) a turbine for expanding said hot compressed gas so as to produce shaft power, said turbine further comprising:
  i) a rotor centrally disposed therein;
  ii) a generally hollow stationary vane disposed therein that is exposed to said hot compressed gas, said stationary vane having an outer shroud portion, an inner shroud portion and an airfoil portion disposed therebetween, said outer shroud portion being in flow communication with a flow of cooling air formed by a second portion of said compressed air, said cooling air passing through said outer shroud portion and said airfoil portion;
  iii) a cavity being formed between said inner shroud portion and said rotor, said cavity receiving said flow of cooling air after passing through said inner shroud portion; and
  iv) said inner shroud portion having a first passage formed therein, said first passage being in flow communication with said cavity, whereby said first passage receives at least a first portion of said cooling air, an array of pin fins disposed in said first passage and substantially radially disposed therein for increasing heat transfer from said inner shroud to said first portion of said cooling air, a first surface exposed to said flow of hot compressed gas and a second surface disposed opposite said first surface, and a plate having a plurality of holes therein attached to said inner shroud for impinging cooling air against said second surface.

14. The gas turbine according to claim 13, wherein said holes in said plate are in flow communication with said cavity, whereby a second portion of said cooling air flows through said holes and forms said cooling air that impinges against said inner shroud second surface.

15. The gas turbine according to claim 14, wherein a chamber is formed between said second surface and said plate, said chamber in flow communication with said holes in said plate and with said first passage, whereby said chamber receives cooling air comprised of said second portion of said cooling air that impinges against said inner shroud second surface and at least a portion of said first portion of said cooling air received by said first passage.

16. The gas turbine according to claim 15, wherein said inner shroud further comprises a plurality of second passages extending from said chamber, whereby said second passages receive at least a portion of said cooling air received by said chamber.

17. The gas turbine according to claim 16, wherein said inner shroud has a trailing edge portion, said second passages disposed in said trailing edge portion.

18. The gas turbine according to claim 17, wherein said inner shroud has first and second longitudinal edges, a second passage formed adjacent said first edge, said second passage in flow communication with said first passage, whereby said second passage receives at least a portion of said first portion of said cooling air received by said first passage.

19. The gas turbine according to claim 18, wherein said airfoil has a radially inward end and a radially outward end, said shroud being formed on said radially inward end, and wherein said second surface is a radially inward facing surface.

* * * * *